United States Patent [19]

Fukushima et al.

[11] Patent Number: 4,885,746
[45] Date of Patent: Dec. 5, 1989

[54] FREQUENCY CONVERTER

[75] Inventors: Takeo Fukushima, Kawasaki; Masami Mizuguchi, Yokohama; Takahiro Furukawa, Tokyo; Yoshiaki Yato, Mitaka; Kenji Sato, Yokohama; Naonobu Fujimoto, Kawasaki; Tetsuro Murase, Yokohama, all of Japan

[73] Assignee: Fujitsu Limited, Kawasaki, Japan

[21] Appl. No.: 728,191

[22] Filed: Apr. 29, 1985

Related U.S. Application Data

[63] Continuation-in-part of Ser. No. 657,663, Oct. 4, 1984, abandoned.

[30] Foreign Application Priority Data

Oct. 19, 1983 [JP] Japan ................... 58-195593

[51] Int. Cl.$^4$ ............................................. H04J 3/06
[52] U.S. Cl. ...................... 370/102; 375/112
[58] Field of Search .............. 370/102, 100, 105, 84; 375/112

[56] References Cited

U.S. PATENT DOCUMENTS

| | | | |
|---|---|---|---|
| 3,136,861 | 6/1964 | Mayo | 370/102 |
| 3,652,802 | 3/1972 | Schellenberg | 370/102 |
| 3,825,899 | 7/1974 | Haeberle et al. | 370/102 |
| 3,946,161 | 3/1976 | Husted et al. | 370/102 |
| 4,002,844 | 1/1977 | Doussoux | 370/102 |
| 4,010,325 | 3/1977 | Kline | 370/102 |
| 4,596,026 | 6/1986 | Cease et al. | 370/102 |
| 4,667,324 | 5/1987 | Graves | 370/102 |

OTHER PUBLICATIONS

Kuroyanagi et al., "On Multiplexing Systems for PCM Hierarchical Networks", *Electronics and Communications in Japan,* vol. 52-A, No. 6, 1969, pp. 16-17, Para. 3, 1, 3, 2.

Sakashita et al., "A 120-Channel PCM System on Symmetrical Pairs", *Japan Telecommunications Review,* No. 3, 1969, pp. 143-155.

"Digital Multiplex Equipment for the LD-4 System", *IEEE 1974 Proceedings of the Int'l Conf. on Communication,* Minneapolis, Jun. 17-19, 1974, pp. 8E-1-8E-5; W. R. Reader.

European Search Report, EP 84 11 2651, by Ex. Van Den Berg, J.G.J. at The Hague, on Oct. 5, 1987.

*Primary Examiner*—Robert L. Griffin
*Assistant Examiner*—Wellington Chin
*Attorney, Agent, or Firm*—Staas & Halsey

[57] ABSTRACT

A stuff (or dummy) pulse and a stuff designation pulse which indicates existence of nonexistence of the dummy pulse are inserted in a multiplexed pulse code modulation signal to convert an input signal frequency to a higher frequency. The frame synchronization pulse is used as the stuff designation pulse. Therefore, stuff designation is possible even when the frequency difference between the input signal frequency and output signal frequency is small.

2 Claims, 5 Drawing Sheets

FREQUENCY CONVERTER

CROSS-REFERENCE TO RELATED APPLICATION

This application is a continuation-in-part of application Ser. No. 657,663, filed Oct. 4, 1984, now abandoned.

BACKGROUND OF THE INVENTION

1. Field of the Invention

The present invention relates to a frequency converter which converts the frequency of a digital signal by inserting a stuff or dummy pulse into a multiplexed signal; more particularly, the present invention is used in converting the frequency of an input signal stored in a memory by a write clock and read from the memory by a read clock having a frequency higher than the write clock frequency.

2. Description of the Related Art

In a communication system using such a frequency converter, the write clock and read clock have different repetition frequencies, therefore the phase difference between write clock and read clock in a transmitter is gradually reduced and the same input signal is sometimes read twice. In order to prevent such rereading, when a phase difference becomes smaller than a constant value, the read operation is inhibited and a stuff or dummy pulse is inserted. Since this dummy pulse is invalid as data, it must be eliminated in the receiver. Accordingly, a stuff designation pulse which indicates existence or nonexistence of the stuff pulse is also inserted together with the stuff pulse, and these signals are transmitted simultaneously.

As described in Japanese Laid-open Patent No. 56-126343, for example, a stuff designation pulse conventionally has a 3-bit structure which allows for transmission error and permits existence of a stuff pulse to be judged on the basis of decision by majority in the receiver. This system has no problem when the repetition frequency of the read clock is sufficiently higher than the write clock, but if the difference between the repetition frequencies of the read clock and write clock is small, the stuff designation pulse cannot be transmitted because there is no margin for inserting a three bit stuff designation pulse.

SUMMARY OF THE INVENTION

It is an object of the present invention to provide a frequency converter which can transmit a stuff designation pulse even for a small frequency difference between an input signal and an output signal.

According to the present invention, the above object can be attained by providing a frequency converter which is capable of converting frequency by inserting a stuff pulse into a multiplex signal. Such a frequency converter includes means for inserting the stuff pulse and means for indicating existence or nonexistence of the stuff pulse and for inserting a frame synchronization signal for frame synchronization. One embodiment of a frequency converter according to the present invention indicates existence or nonexistence of the stuff pulse by logic a "1" or "0", using the frame synchronization signal.

According to the present invention, the existence or nonexistence of a stuff pulse can be indicated by a stuff designation pulse of 1 bit, and therefore the stuff designation pulse can be transmitted even in a case where the difference between repetition frequencies of the write and read clocks is small.

Moreover, in this case, since removal of the stuff or dummy pulse (destuff control) is carried out only when the frame synchronization signal is obtained in the receiver, a stuff designation pulse formed by only one bit is not influenced by transmission error.

BRIEF DESCRIPTION OF THE DRAWINGS

FIG. 1(a) is the main frame format and FIGS. 1(b) and 1(c) are subframe formats;

DESCRIPTION OF THE PREFERRED EMBODIMENTS

Figure 1A:
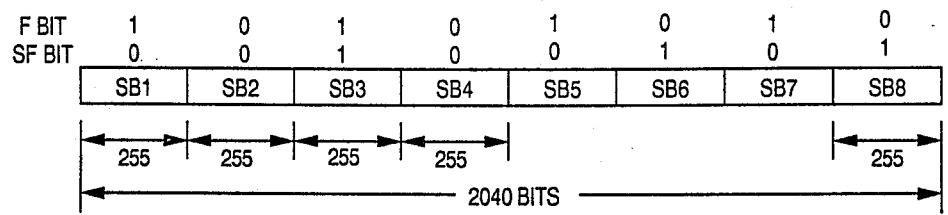
FIGS. 1(a)–(c) are examples of frame formats to which the present invention is applied.
Figure 1B:
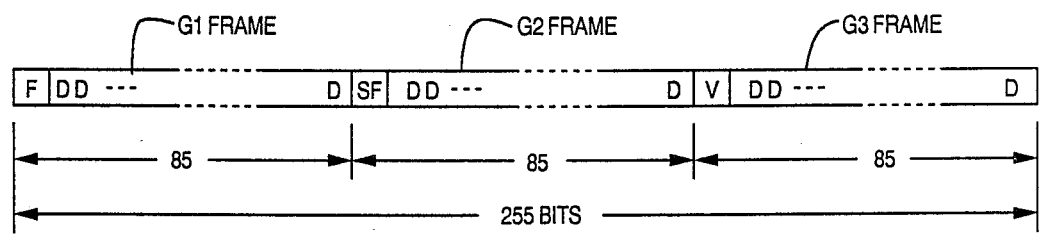

The present invention will be described below with reference to the drawings. FIG. 1 is an example of a frame format in the case of a PCM multiplex signal with a clock frequency of 704 kb/s which is synchronously converted into a PCM multiplex signal with a clock frequency of 710.618 kb/s. As shown in FIG. 1(a), the main frame is composed of eight sub-frames and each sub-frame is composed, as shown in FIG. 1(b), of three G frames, namely G1, G2 and G3 frames. The G1 frame consists of a subframe synchronization pulse (F) and data pulse (D) of 84 bits, the G2 frame consists of the SF pulse of 1 bit which is used in common as the main frame synchronization pulse and stuff designation pulse, and a data pulse D of 84 bits, and the G3 frame consists of the stuff pulse V of 1 bit and data pulse D of 84 bits. Each subframe is composed of 255 bits. The code train 00100101 is assigned bit by bit to the SF pulse in the G2 frame of a series of 8 subframes. This code train is thus repeated for every eight subframes. Namely, the code train is completed exactly once within the period of each main frame, as illustrated in FIG. 1(a). In this example, the code "1" indicates that the stuff pulse exists, i.e., that a dummy pulse is included in, e.g., the third G frame G3 of that subframe, while the code "0" indicates that the stuff pulse does not exist.

Figure 1C:
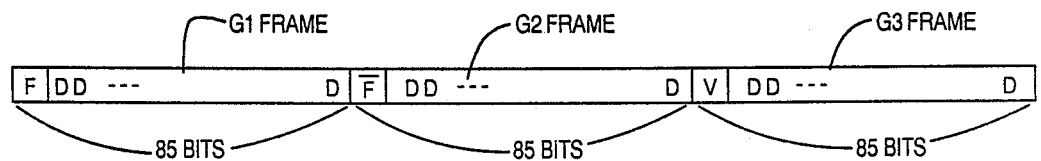

The subframe of FIG. 1(c) is composed of three G frames. In this embodiment of the present invention, the subframe synchronization pulse F of the first frame G1 forms the code train 10101010 for one mainframe, the frame synchronization pulse $\overline{F}$ of the second G frame G2 forms the code train 01010101, and the frame synchronization pulse of the third G frame G3 is included at the position V only when the stuff or dummy pulse is present. In this embodiment, existence or nonexistence of the stuff pulse can be determined by the logic level of the frame synchronization pulse $\overline{F}$, for a frequency ratio between input and output frequencies which is different than that in FIG. 1(b).

The preferred embodiment of the present invention will be described with reference to FIG. 2. In FIG. 2, reference numerals 1 and 11 are buffer memories, 2 and 12 are phase lock loop (PLL) circuits, 3 is a stuff control circuit, 4 and 14 are frequency dividers, 5 is a frame signal generator, 6 is a pulse inserter, 13 is a destuff control circuit, 15 is a synchronization circuit and 16 is a clock extraction circuit.

Figure 2A:
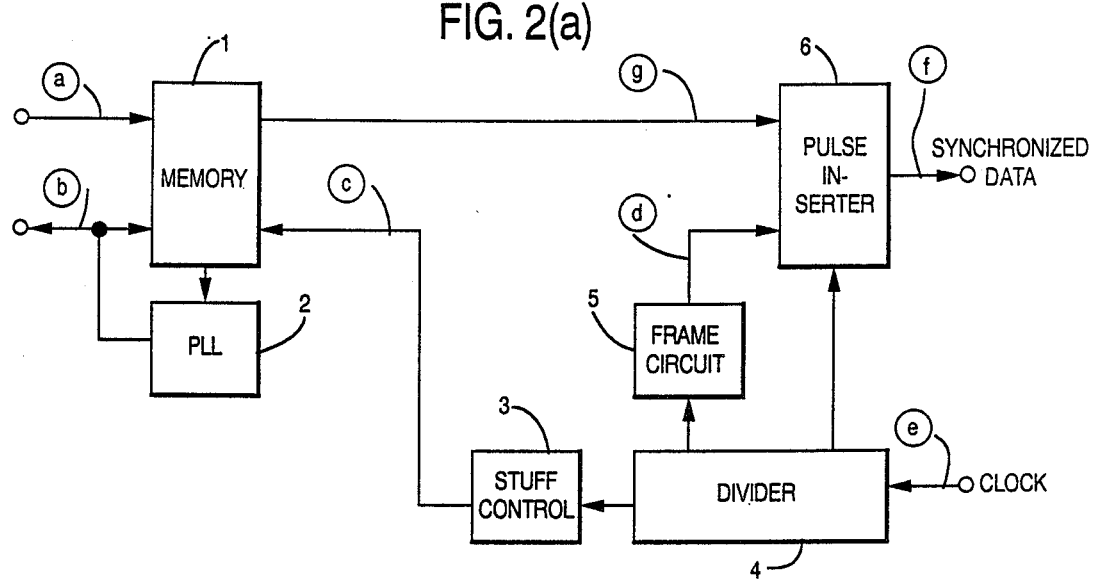
FIG. 2(a) is a block diagram of an embodiment of a frequency converter according to the present invention.

In FIG. 2(a), the data ⓐ is written into the buffer memory 1 in synchronization with a write clock signal ⓑ having a bit rate of 704 kb/s output by the PLL 2. This clock signal ⓑ is generated as indicated below from a high frequency clock signal ⓔ. Namely, the clock signal ⓔ is divided by the divider 4 to provide the basic frequency required for forming the frame and is then subjected to stuff control (extraction of a clock signal) in the stuff control circuit 3 so that a constant stuff rate can be obtained ($\frac{2}{3}$ in the example of FIG. 1). Namely, as a result of stuffing (insertion of dummy pulses), the output pulse train ⓒ of the stuff control circuit 3 has a pulse frequency of 704 kb/s with a timing such that a dummy pulse can be inserted as the leading bit position of the G3 frame when the main frame synchronization pulse SF is "1" and the read operation of data from the buffer memory 1 is inhibited. Moreover, the phase of the output pulse train ⓒ is synchronized by the PLL circuit 2 and such pulse is output as the clock signal b. Simultaneously, an output of the frequency divider 4 is used to drive a frame signal generator 5 which generates the required frame signal ⓓ and forms a frame as shown in FIG. 1 at the output of the pulse inserter 6.

A phase comparator in the PLL 2 compares the phase of an output of a voltage controlled oscillator and the phase of the read clock signal ⓒ, and therefore it is enough for the buffer memory 1 to have the capacity to absorb only the fluctuation of phase due to the frame bit, stuff bit and stuff designation pulse insertion.

With the aforementioned structure, the data signal written in the buffer memory 1 is read by the clock signal ⓒ and is then sent to the pulse inserter 6 as the data ⓖ. In the pulse inserter 6, the frame signal ⓓ is inserted into the data ⓖ as described above, and the frame as shown in FIGS. 1(a) and 1(b) is formed and is output to the transmission line as the synchronized output data ⓕ.

The time at which the main frame synchronization pulse SF becomes "1" matches the time at which the read operation of buffer memory 1 is inhibited. When the read operation is inhibited, the data ⓖ to be input to the pulse inserter 6 is logic "0" and it becomes the dummy pulse.

Figure 2B:
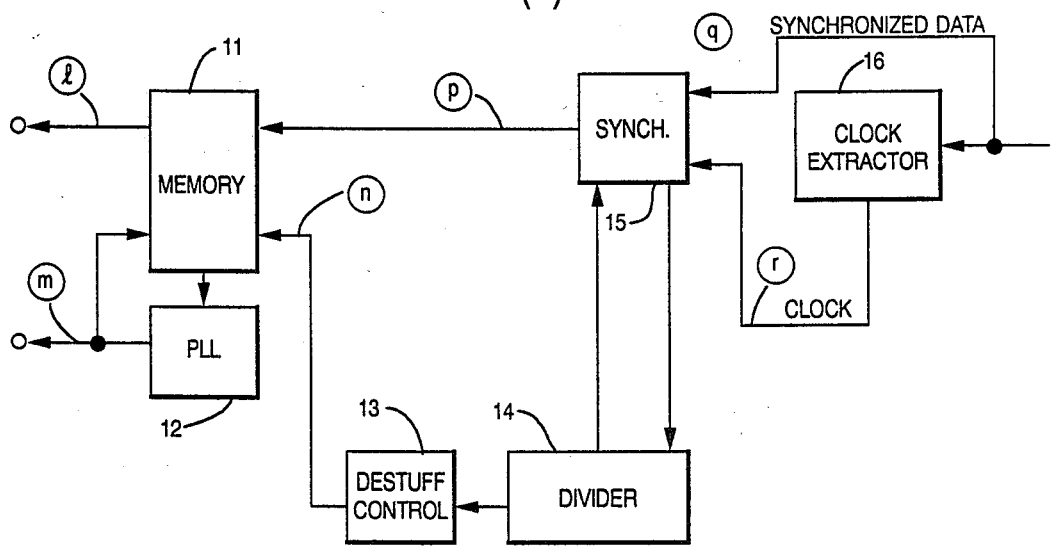
FIG. 2(b) is an embodiment of a receiver according to the present invention.

The synchronized output data ⓕ sent to the transmission line is received by the clock extraction circuit 16 in the receiver shown in FIG. 2(b) and the synchronized clock ⓡ is extracted. The subframe synchronization pulse F and the main frame synchronization signal SF are removed from the synchronized data ⓠ in the synchronizer 15 and only the data ⓟ in signal ⓠ is written into the buffer memory 11. Meanwhile, the synchronized clock input ⓡ is divided by the divider 14 and a timing signal for extraction of sub- and main-frame synchronization signals is output to the synchronizer 15, while a timing signal for writing data to the buffer memory 11 is output simultaneously to the destuff controller 13. In the present invention, the data which indicates existence or nonexistence of a stuff pulse in the transmitter is contained in the code train of the main frame synchronization signal SF and it is also used as the stuff designation pulse.

In the destuff controller 13, the data corresponding to the stuff designation pulse can be obtained from the code train of the ultiframe synchronization signal SF. Namely, the data for judging existence or nonexistence of the stuff or dummy pulse V can be obtained. The multiframe synchronization signal SF indicates that the stuff pulse V does not exist when it is "1". Therefore, when SF="0", the leading pulse in the G3 frame is judged as part of the data. On the other hand, the synchronization signal SF indicates that the stuff pulse exists when it is "1". In this case, the leading pulse in the G3 frame is judged as invalid, i.e., it is not included in the data ⓟ. In accordance with the value of the SF bit, the destuff controller 13 inputs the clock signal ⓝ to the buffer memory so that a valid data pulse is written to the buffer memory 11 but the writing of the invalid (stuff or dummy) pulse V is inhibited. Such clock pulses are extracted and the phases of them are averaged by the PLL circuit 12 and a clock signal ⓜ corresponding to the original low frequency clock signal ⓑ can be recovered at the output of the PLL circuit 12. The data in the buffer memory 11 is read by the recovered clock signal ⓜ and thereby the data output signal ⓛ can be obtained at a frequency of, e.g., 704 kb/s.

Figure 3:
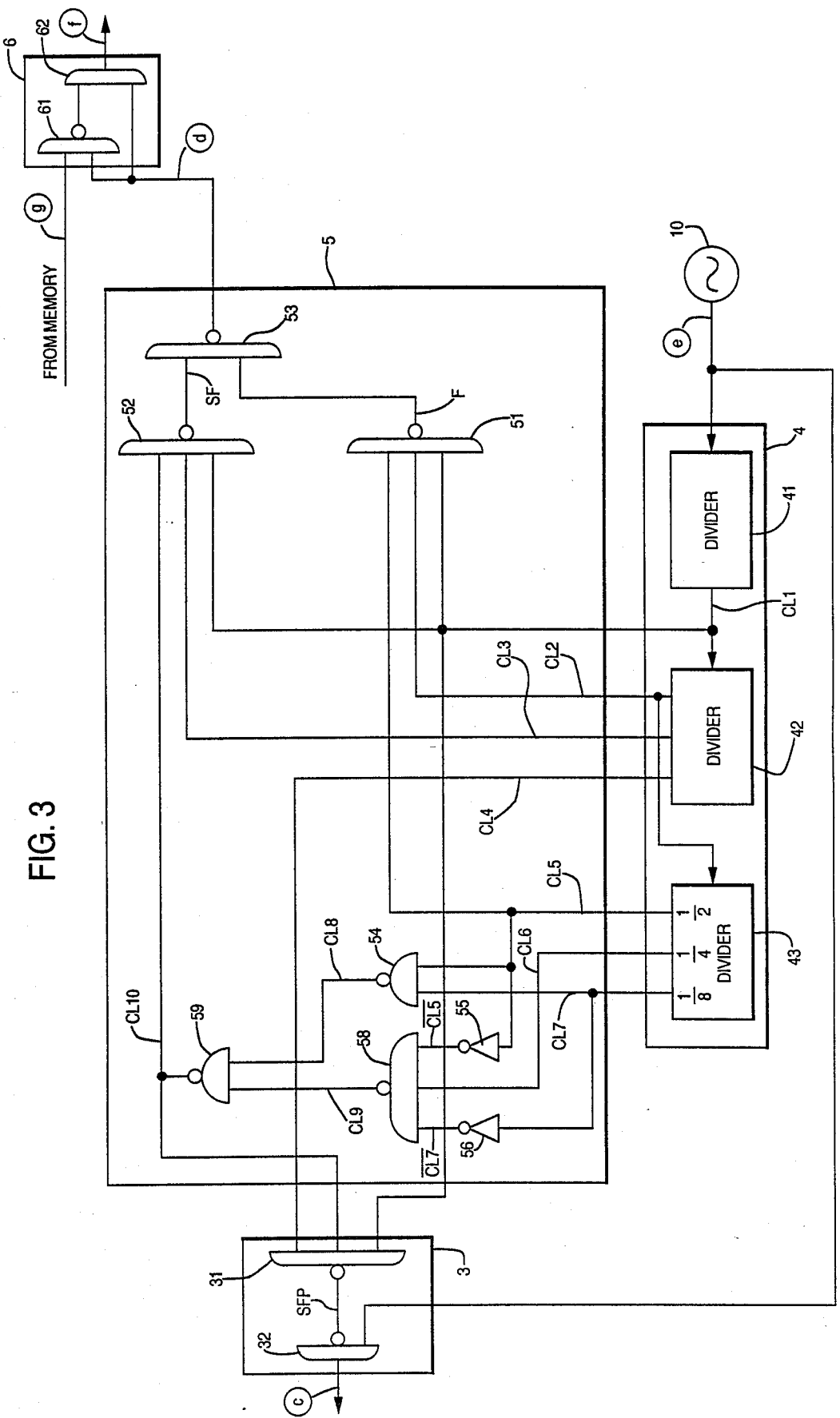
FIG. 3 is a block diagram of embodiments of a stuff controller, frequency divider, frame signal generator and pulse inserter.
Figure 4:
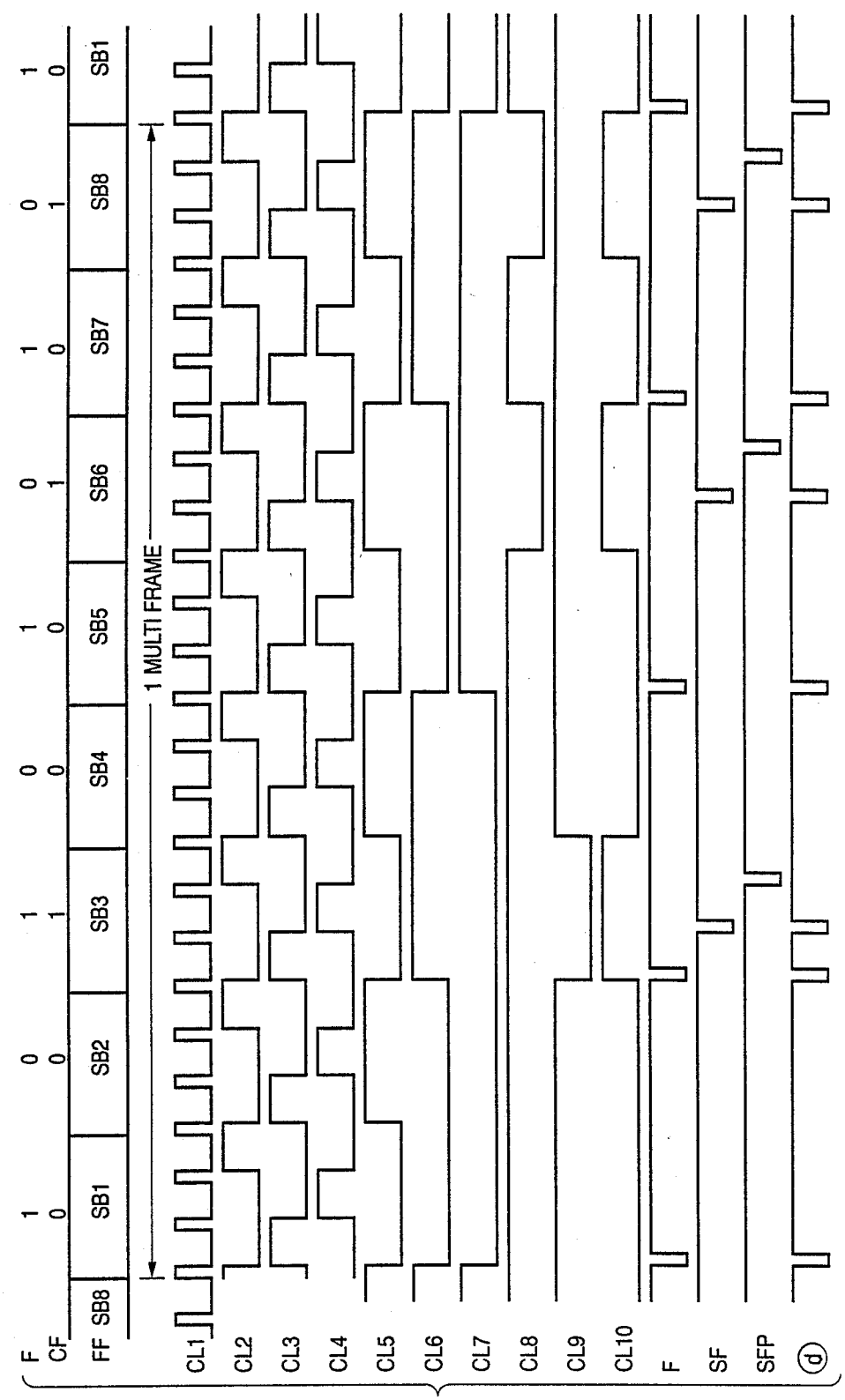
FIG. 4 is a time chart for FIG. 3.

The stuff controller 3, frequency divider 4, frame signal generator 5 and pulse inserter 6 are described in more detail with reference to FIG. 3 and FIG. 4. In FIG. 3, 10 is a frequency generator which generates clock signal ⓔ; 31, 51-54, 58, 59 and 61 are NAND gates; 41, 42 and 43 are frequency dividers; 32 is an AND gate with an inverting input; 55 and 56 are inverters; and 62 is an AND gate. The signal waveforms of respective portions in FIG. 3 are indicated by the same symbols in FIG. 4. In FIG. 4, F is the code train of the subframe synchronization signal, while SF is the code train of the multiframe synchronization signal and FF is the frame format.

The operations of the embodiment illustrated in FIGS. 3 and 4 is described below. The clock signal ⓔ generated by the generator 10 is input to a divider 4, divided by 85 in the divider 41 and output as clock signal CL1, because one G frame is composed of 85 bits. The clock signal CL1 indicates the frame signal position of each G frame. The clock signal CL1 is further divided by 3 in the divider 42 and is then output as clock signals CL2, CL3 and CL4 at different times, i.e., with different phases.

The output of clock signal CL2 indicates the occurrence of the G3 frame, while clock signal CL3 indicates the occurrence of the G1 frame and clock signal CL4 indicates the G2 frame. The clock signal CL3 is input to the divider 43 which outputs a clock signal CL5, which is CL3 divided by 2; clock signal CL6, which is CL3 divided by 4; and clock signal CL7, which is CL3 divided by 8.

The clock signals CL5 and CL7 are inverted by inverters 55 and 56. The outputs $\overline{CL5}$ and $\overline{CL7}$ of the inverters 55 and 56 are supplied to the NAND gate 58 along with the clock signal CL6, while the clock signals CL5 and CL7 are supplied directly to NAND gate 54. The outputs CL8 and CL9 of the NAND gates 54 and 58 are supplied to NAND gate 59 which outputs a clock signal CL10.

The clock signals CL1, CL2 and CL5 are input to the NAND gate 51 and the subframe synchronization signal F is output therefrom. In addition, the clock signals CL1, CL3 and CL10 are input to the NAND gate 52, and the main frame synchronization signal (namely, the stuff designation pulse) SF is output therefrom. The clock signals CL1, CL4 and CL10 are input to the NAND gate 31 and the stuff control pulse SFP, which conducts extraction of clock signal (e) three times for each multiframe, is output therefrom.

An output of NAND gate 31 is input to the inverting input terminal of AND gate 32. The clock signal (e) is input to the other input of the AND gate 32, and the clock signal (c) which is extracted by the stuff control pulse SFP as described above, is output from the stuff control circuit 3. On the other hand, the subframe synchronization signal F and main frame synchronization signal SF are input to the NAND gate 53, the output of which is input to the NAND gate 61 and AND gate 62 of the pulse inserter 6 as the synchronization signal (d).

The input signal (g) read from the buffer memory 1 is input to the other input of NAND gate 61 which inhibits the output of the synchronized data signal (f) in accordance with the pattern of the synchronization signal (d) generated by the subframe synchronization signal F and the main frame synchronization signal SF. When the output of the NAND gate 53 has logic level "1", the synchronization signal (d), which is a combination of the subframe synchronization signal F and the main frame synchronization signal SF, is output from the AND gate 62.

Figure 5:
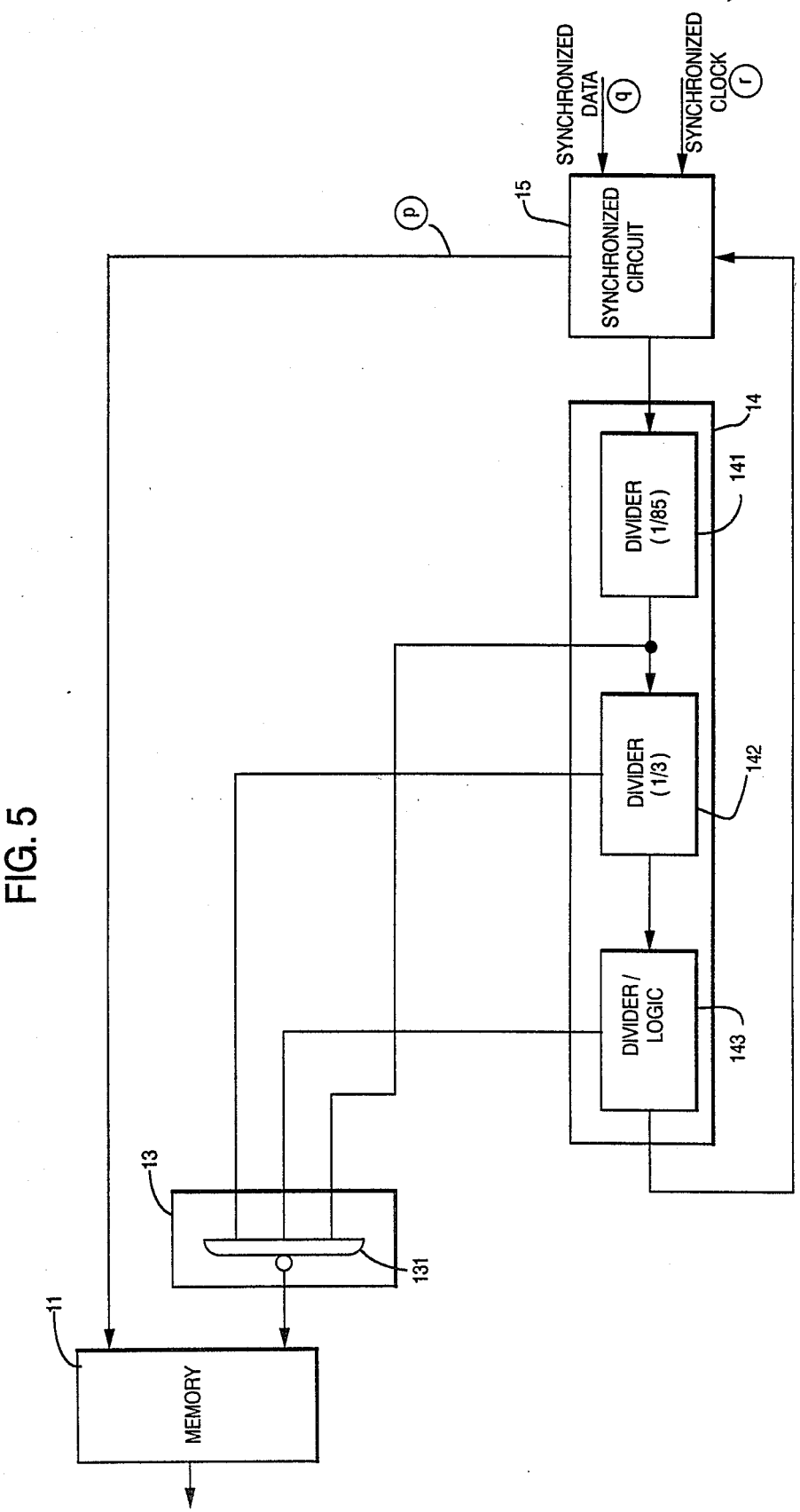
FIG. 5 is a block diagram of embodiments of a destuff controller and a frequency divider in the receiver.

Next, practical examples of the divider 14 and destuff control circuit 15 in the receiver are described with reference to FIG. 5. In FIG. 5, reference numerals 141, 142 and 143 are dividers, and 131 is a NAND gate. The clock signal (r) extracted by the clock extraction circuit 16 and the synchronized data (q) received over the transmission line are input to the synchronization circuit 15. In the circuit illustrated in FIG. 5, the subframe synchronization signal F and main frame synchronization signal SF are removed from the synchronized data (q), but an output of divider 14 is fed back to the synchronization circuit 15 in order to lock the phases of the output of divider 14 and the synchronized data (q).

In the divider 14, the frequency dividing circuits 141 and 142 formed in the divider 14 respectively have the same functions as the frequency dividing circuits 41 and 42 in FIG. 3. Divider/logic circuit 143 corresponds to dividing circuit 43 plus gates 54–59. As described regarding FIG. 3, an output of the dividing circuit 141, corresponding to the clock signal CL1 in FIG. 3, an output of the divided circuit 142, corresponding to the clock signal CL4 in FIG. 3, and an output of the dividing logic circuit 143, corresponding to the clock signal CL10 in FIG. 3, are input to the NAND gate 131 which forms the destuff control circuit 13, in order to provide the destuff timing. Thereby, the pulse indicated as SFP in FIG. 4 is input to the buffer memory 11 from the NAND gate 131. The buffer memory 11 is inhibited from writing the synchronized data (p) when the pulse SFP is generated.

As described above, according to the present invention, the multiframe synchronization signal is also used as the stuff designation pulse SF. Therefore, the stuff designation pulse SF can be transmitted even when the conversion ratio (difference) between internal memory rates and transmit rates is small.

We claim:

1. A method of converting from a first frequency to a second frequency in a multiplexed signal, comprising the steps of:
    (a) determining a first number of dummy pulses in dependence upon a frequency ratio between the first and second frequencies;
    (b) inserting the first number of dummy pulses into a first number of frames of the multiplexed signal;
    (c) inserting a single pulse into each of a second number of the frames of the multiplexed signal, the single pulse used for frame synchronization of frames of the multiplexed signal and for indicating one of existence and non-existence of a second number of the dummy pulses in a corresponding frame, the single pulse having a first logic level representing existence of the second number of dummy pulses and a second logic level representing non-existence of the second number of dummy pulses and the frequency ratio corresponding to a logic level ratio of a third number of frames containing the single pulse with the first logic level divided by a fourth number of frames containing the single pulse with the second logic level.

2. A method according to claim 1, wherein the third number is one.

* * * * *